United States Patent
Olmsted

[19]

[11] Patent Number: 6,089,537
[45] Date of Patent: Jul. 18, 2000

[54] PENDULUM VALVE ASSEMBLY

[75] Inventor: Richard W. Olmsted, Londonberry, N.H.

[73] Assignee: MKS Instruments, Inc., Andover, Mass.

[21] Appl. No.: 09/339,084

[22] Filed: Jun. 23, 1999

[51] Int. Cl.$^7$ ................................ F16K 3/04; F16K 31/04
[52] U.S. Cl. .................. 251/129.11; 251/228; 251/158; 251/203; 251/251
[58] Field of Search ............................ 251/129.11, 250.5, 251/248, 228, 203, 193, 204, 162, 163, 251, 158

[56] References Cited

U.S. PATENT DOCUMENTS

| | | | |
|---|---|---|---|
| 2,749,082 | 6/1956 | Allen | 251/162 |
| 2,850,260 | 9/1958 | Perazone et al. | 251/169 |
| 3,120,944 | 2/1964 | Cogez et al. | 251/203 |
| 3,557,822 | 1/1971 | Chronister | 137/315 |
| 3,722,857 | 3/1973 | Townsend | 251/203 |
| 3,854,696 | 12/1974 | Keyes et al. | 251/163 |
| 3,973,753 | 8/1976 | Wheeler | 251/204 |
| 4,044,993 | 8/1977 | Wheeler | 251/204 |
| 4,052,036 | 10/1977 | Schertler | 251/144 |
| 4,073,468 | 2/1978 | Erwin | 251/77 |
| 4,088,301 | 5/1978 | Ehmig | 251/334 |
| 4,089,505 | 5/1978 | Anderle et al. | 251/133 |
| 4,136,854 | 1/1979 | Ehmig et al. | 251/333 |
| 4,219,183 | 8/1980 | Hoffmann et al. | 251/228 |
| 4,333,631 | 6/1982 | Bosch | 251/159 |
| 4,395,049 | 7/1983 | Schertler | 277/236 |
| 4,442,996 | 4/1984 | Erwin | 251/77 |
| 4,458,905 | 7/1984 | Bosch | 277/236 |
| 4,519,578 | 5/1985 | Boeckman et al. | 251/163 |
| 4,627,567 | 12/1986 | Thorn | 236/34.5 |
| 4,785,844 | 11/1988 | Pankov | 137/242 |
| 4,921,213 | 5/1990 | Geiser | 251/328 |
| 5,120,019 | 6/1992 | Davis, Jr. | 251/193 |
| 5,330,157 | 7/1994 | Dern et al. | 251/162 |
| 5,379,983 | 1/1995 | Geiser | 251/167 |
| 5,577,707 | 11/1996 | Brida | 251/159 |
| 5,873,562 | 2/1999 | Marugg | 251/301 |

FOREIGN PATENT DOCUMENTS

| | | | |
|---|---|---|---|
| 1190755 | 4/1965 | Germany | 251/360 |
| 1050435 | 12/1966 | United Kingdom . | |

*Primary Examiner*—Joseph A. Kaufman
*Assistant Examiner*—Eric Keasel
*Attorney, Agent, or Firm*—McDermott, Will & Emery

[57] ABSTRACT

A pendulum valve assembly comprises a housing including an interior space and a pair of openings through which fluid can enter and exit the interior space; a valve seat disposed in the interior space around the edge of a first of the openings; a disk mounted relative to the housing so that the disk is movable within the interior space between a completely opened position and a completely closed position, the disk being constructed so that when the disk is moved to the closed position the disk engages the valve seat and seals the first opening so that fluid can not pass therethrough; a longitudinal shaft defining a longitudinal axis, fixedly coupled to the disk through at least one pivot arm and at least partially mounted within the housing so that (a) the shaft and disk can rotate about the longitudinal axis between a first angular position where the disk is in the completely opened position and a second angular position where the disk is substantially axially aligned with the first opening but spaced therefrom, and (b) the shaft and disk can move longitudinally, substantially parallel to the longitudinal axis, so that the disk can move between the second angular position and the closed position as it continues to rotate; and a cam mechanism coupled between the shaft and the housing and arranged so as to control the rotational movement of the shaft and disk between the first angular position and the second angular position and the longitudinal movement and continued rotational movement of the shaft and disk between the second angular position and the completely closed position.

5 Claims, 6 Drawing Sheets

PENDULUM VALVE ASSEMBLY

RELATED APPLICATIONS

This application is related to U.S. patent application Ser. No. 09/339,082, entitled Integrated Turbo Pump and Control Valve System, filed in the name of Joseph Maher and Richard W. Olmsted on the same day as the present application, and assigned to the present assignee.

FIELD OF THE INVENTION

The present invention relates to pendulum or gate valve assemblies, and more particularly to an improved pendulum valve comprising a rotating cam, valve closing mechanism.

BACKGROUND OF THE INVENTION

Pendulum valves are particularly useful in high purity gas delivery systems, such as those used in semiconductor manufacturing or other thin film coating processes. The valves are particularly useful for processes performed at very low pressures (high vacuums), e.g., a pressure on the order of one torr or less. One ultra-high vacuum system adapted to operate at low conductances includes a turbo pump, and a pendulum or slide valve for controlling the pressure created by the turbo pump within a predetermined range. Such systems typically utilize a turbo pump and a combination of valves connected together so as to provide a closed system as well as careful control of pressure when the pendulum valve is near the closed and sealed position, where pressure control is more difficult.

As the dimensions of semiconductor devices decrease and their densities increase, semiconductor manufacturing processes have become increasingly dependent on precise pressure and mass flow control. It is thus critical that the valve body of the pendulum valve make a tight seal with the valve seat when the valve is moved to its closed position. The movement of the valve body of a pendulum valve, usually in the form of a disk, is between a completely opened position and a completely closed position. The movement usually requires rotational movement between a first angular position and a second angular position, and some translational movement so that the disk can be moved into alignment with the opening in the valve and so that the disk can be moved into contact with a valve seat provided around the inside edge of the opening through which gas flows. Prior pendulum valves typically use multiple actuator elements which are inherently difficult to effect precise movement of the valve body of the pendulum valve, and therefore more difficult to utilize for flow control purposes. For examples of such prior pendulum valves see the following: U.S. Pat. Nos. 2,850,260; 3,557,822; 3,722,857; 3,973,753; 4,052,036; 4,089,505; 4,333,631; 4,627,567; 4,785,844; 5,577,707; 5,873,562; British Patent No. 1,050,435 and German Patent 1,190,755. Other valve structures are shown in U.S. Pat. Nos. 2,749,082; 3,854,696; 4,073,468; 4,088,301; 4,135,854; 4,395,049; 4,442,996; 4,458,905; 4,519,578; 4,921,213; 5,379,983; 5,330,157;

SUMMARY OF THE INVENTION

In accordance with the present invention, an improved pendulum valve assembly is designed and constructed so as to eliminate the multiple actuator mechanisms of the prior art and replace it with a simple rotating cam mechanism that precisely controls the rotational and axial movement of the disk between a completely opened position and a completely closed position.

In one embodiment the pendulum valve assembly comprises a housing including an interior space and a pair of openings through which gas can enter and exit the interior space; a valve seat disposed in the interior space around the edge of a first of said openings; a valve body including a disk mounted relative to the housing so that the disk is movable within the interior space between a completely opened position and a completely closed position, the valve body being constructed so that when the disk is moved to the closed position the disk engages the valve seat and seals the first opening so that fluid can not pass therethrough; a longitudinal shaft defining a longitudinal axis, fixedly coupled to the disk through at least one pivot arm and at least partially mounted within the housing so that (a) the shaft and disk can rotate about the longitudinal axis between a first angular position where the disk is in the completely opened position and a second angular position where the disk is substantially axially aligned with the first opening but spaced therefrom, and (b) the shaft and disk can move longitudinally, substantially parallel to the longitudinal axis, so that the disk can move between the second angular position and the closed position as it continues to rotate; and a cam mechanism coupled between the shaft and the housing and arranged so as to control the rotational movement of the shaft and disk between the first angular position and the second angular position and the longitudinal movement and continued rotational movement of the shaft and disk between the second angular position and the completely closed position.

In one embodiment the pendulum valve assembly further includes a reversible stepping motor coupled to the shaft for rotating the shaft and disk between the completely opened and closed positions. In one embodiment the reversible motor is coupled to the shaft through a gear mechanism. In one embodiment the motor includes a drive shaft, and the gear mechanism includes at least two gears, one fixed relative to the motor drive shaft and the other fixed relative to the longitudinal shaft, wherein the two gears are adapted to rotate relative to one another when the longitudinal shaft and disk between are rotated between the completely opened and closed positions and move longitudinally relative to one another when the longitudinal shaft and disk are moved longitudinally between the second angular position and the completely closed position.

In one embodiment the cam mechanism includes (a) a cam element fixed to the shaft so as to rotate and move longitudinally with the shaft, the cam element including a cam surface, and (b) a cam follower fixed relative to the housing and engaging the cam surface so as to define the movement of the shaft and disk relative to the housing.

DETAILED DESCRIPTION OF THE DRAWINGS

Figure 1:
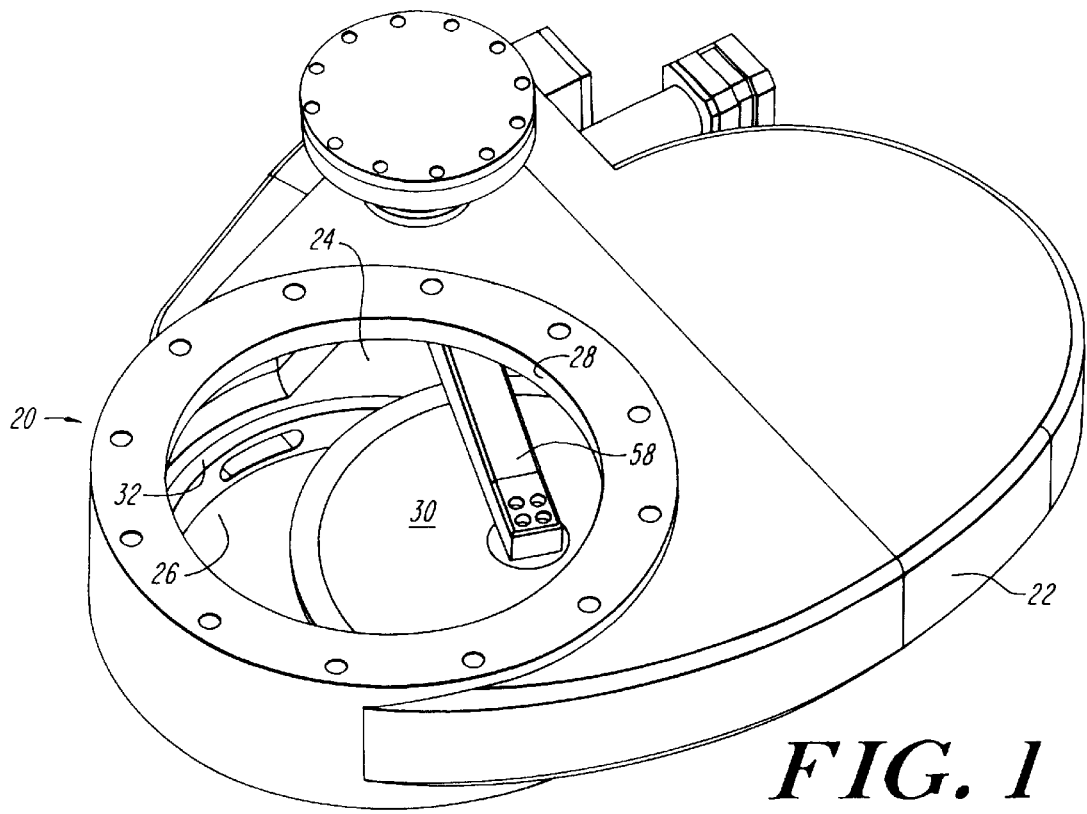
FIG. 1 is a perspective view of one end of a pendulum valve assembly constructed in accordance with the present invention.
Figure 2:
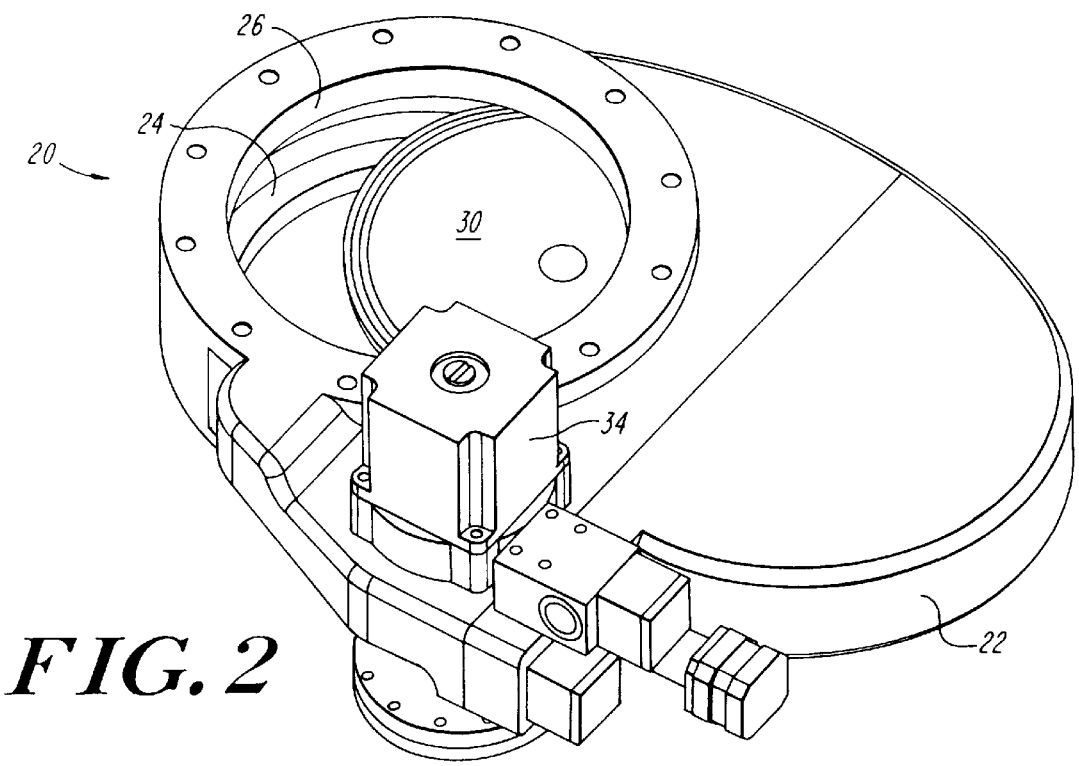
FIG. 2 is a perspective view of the end of a pendulum valve assembly shown in FIG. 1.
Figure 3:
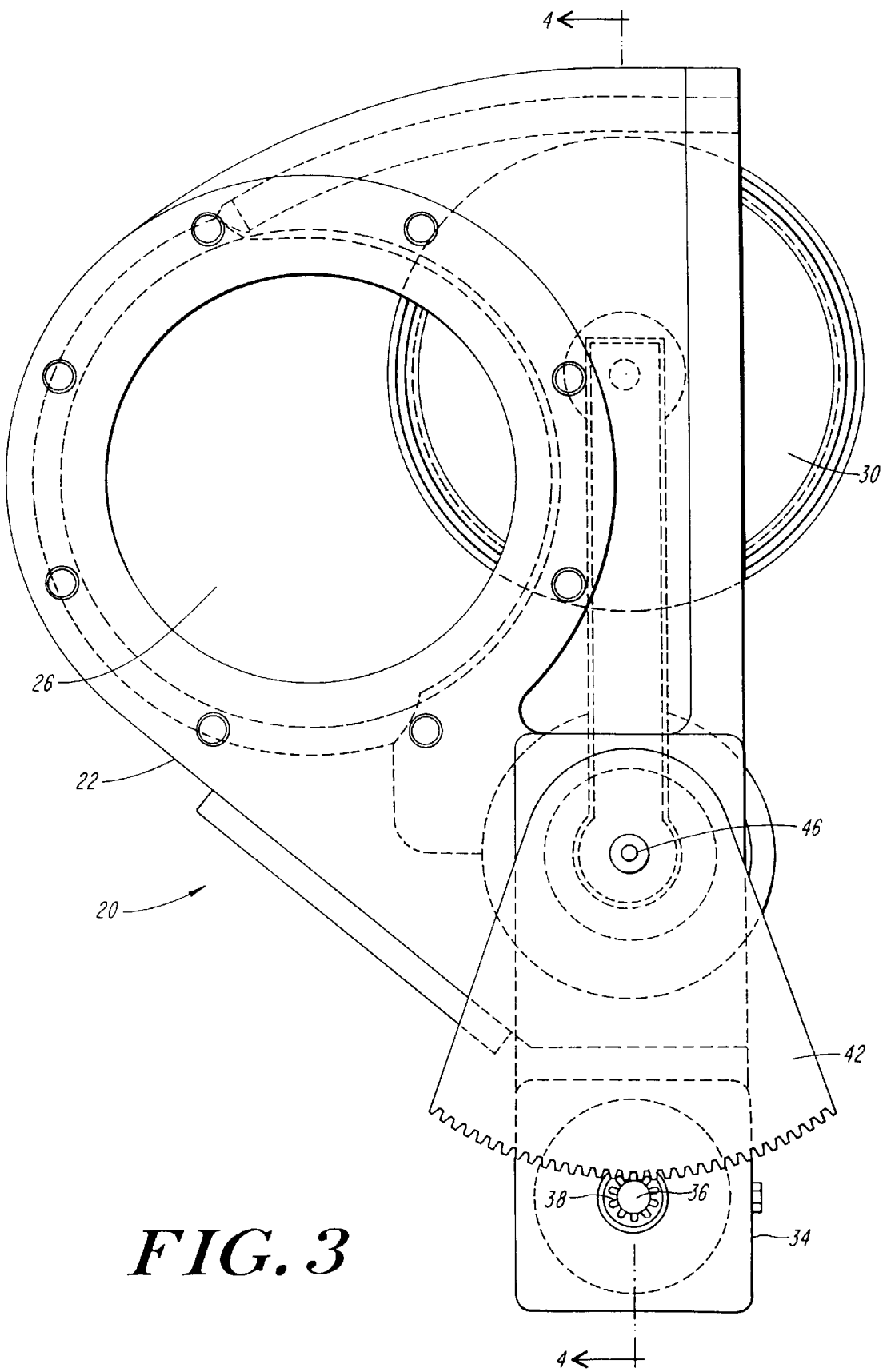
FIG. 3 is an end view of pendulum valve assembly constructed according to the present invention with a portion of the housing removed.
Figure 4:
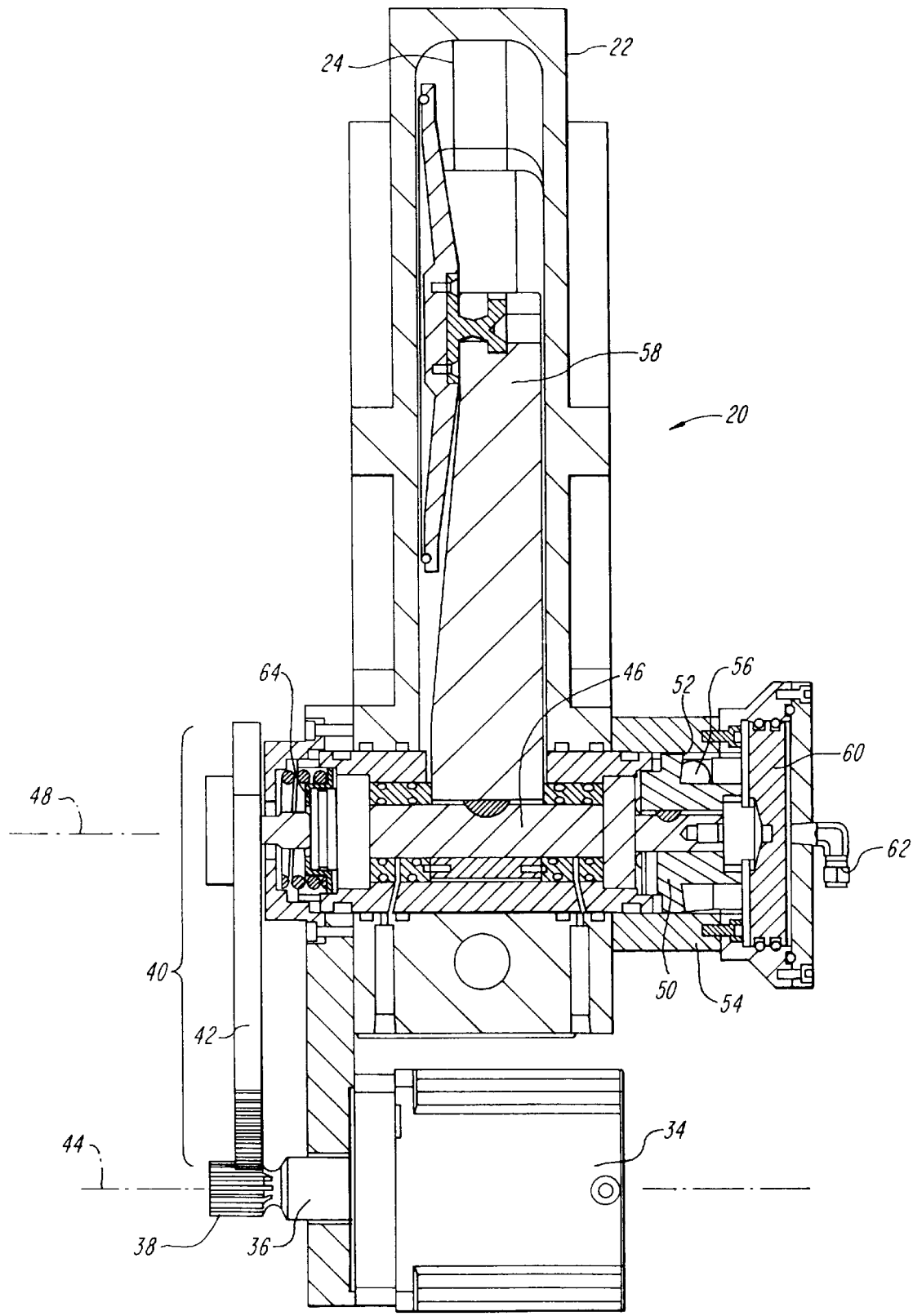
FIG. 4 is a cross-sectional view taken along line 4—4 of FIG. 3.
Figure 5:
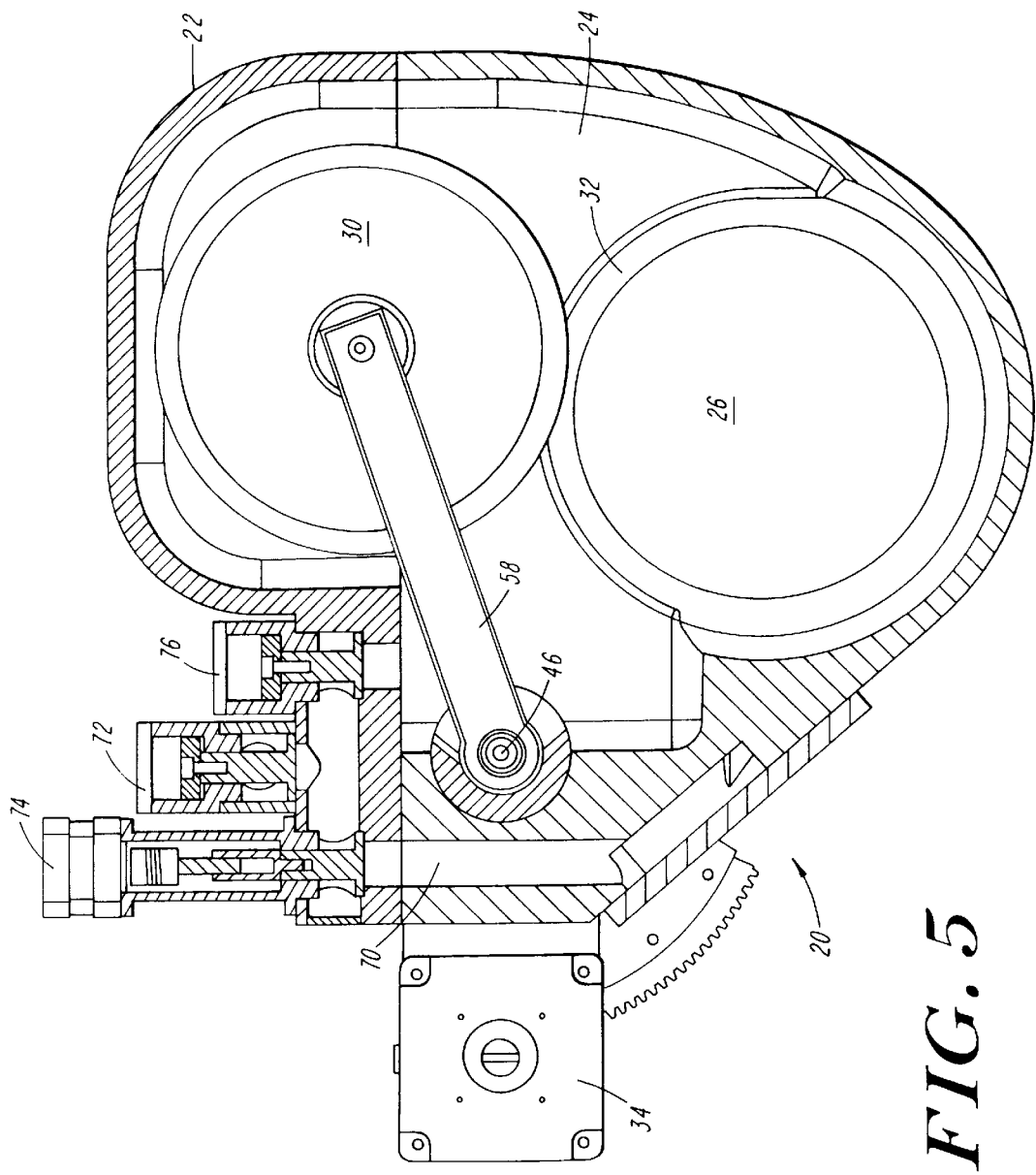
FIG. 5 is a cross sectional view taken through the interior space of the pendulum valve assembly of FIG. 1 with the disk in the completely opened position.
Figure 6:
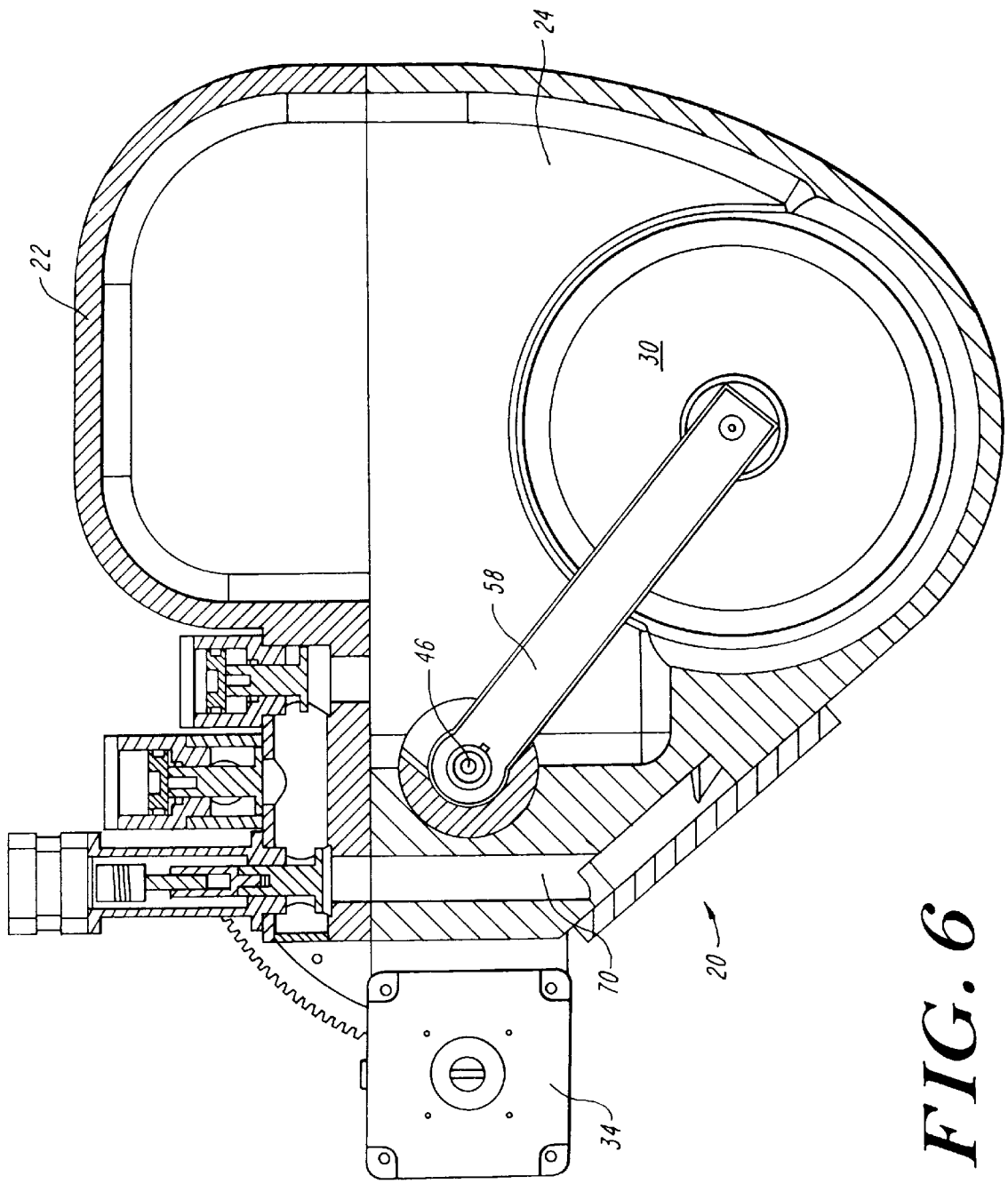
FIG. 6 is a cross sectional view taken through the interior space of the pendulum valve assembly of FIG. 1 with the disk in the completely closed position.
Figure 7:
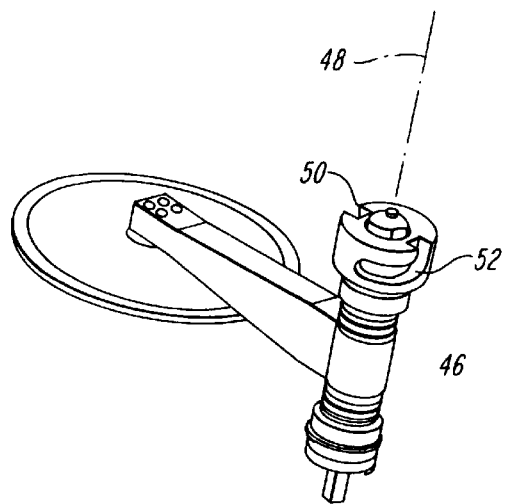
FIG. 7 is an isometric view of the shaft, pivot arm and disk arrangement of the pendulum valve assembly of FIGS. 1–6.
Figure 8:
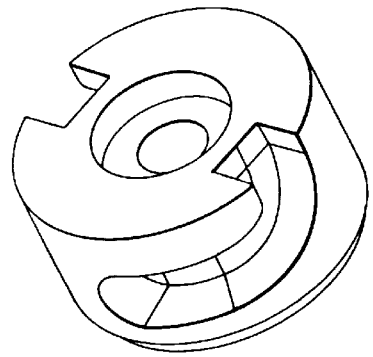
FIG. 8 is an isometric view of the cam element of the cam mechanism illustrated in FIGS. 4 and 7.

As best shown in FIGS. 1–6, the pendulum valve assembly 20 includes a housing 22 defining an interior space 24. The housing 22 includes a pair of opposing openings 26 and 28 through which gas passes into the interior space 24 and out the other side of the gate valve when the gate valve is opened. One opening can, for example, be connected to a process chamber and the other connected to a pump. The gate valve assembly controls the flow of gas through the gate valve by controlling the position of the valve body, preferably including a disk 30, between a completely opened position (as illustrated in FIG. 5) and a completely closed position (as illustrated in FIG. 6). When in the closed position the disk 30 comes into contact with a valve seat 32 provided in the interior space around the edge of opening 26.

Figure 9:
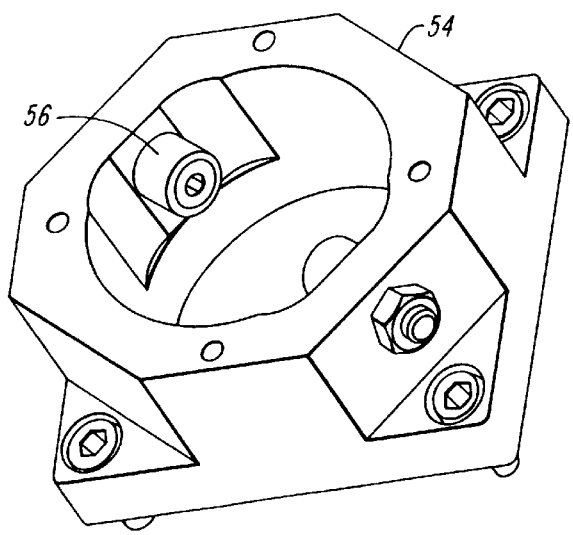
FIG. 9 is an isometric view of the cam follower support secured to the housing and including a cam roller interactive with the cam surface of the cam element shown in FIG. 8.

In order to control the position of disk 30, the assembly 20 includes a motor 34 mounted to housing 22. The motor preferably is a reversible stepping motor and, as best seen in FIGS. 3 and 4, includes a motor shaft 36. Shaft 36 is fixed to, or otherwise provided with, the rotary gear 38 of the gear mechanism 40. Gear mechanism 40 also includes a rotary gear 42 which rotates opposite to the rotational movement of the rotary gear 38 when the motor 34 drives the gear 38 in a rotational direction about the motor shaft axis 44. The rotary gear 42 is fixed to a longitudinal shaft 46, which (as best seen in FIG. 4) in turn is at least partially mounted within the housing 22 so as to rotate about its longitudinal axis 48 in response to rotation of the gear 42, and move axially along its longitudinal axis (into and out of the plane of FIGS. 2 and 3, and left and right in FIG. 4). The longitudinal shaft 46 is preferably fixedly attached at one end with a rotary cam element 50 (seen in FIG. 4). The rotary cam element 50 has a cylindrical surface provided with a slot 52 defining a cam surface. A cam roller collar 54 (shown is FIGS. 4 and 9) is fixed to the housing 22, around the longitudinal shaft 46. The collar 54 includes a cam roller 56 disposed within the slot 52 defining the cam surface. The shaft is also fixed to the pivot arm 58, which in turn supports the disk 30. A pneumatic piston 60 provides a force on shaft 46 in an axial direction so as to force the disk 30 towards its closed position when a pressurized gas is provided through the port 62. A valve arrangement (not shown) can be connected to a source of pressurized gas (not shown) and to the port 62, so that the pressurized gas can be used to force the pneumatic piston toward the closed position when closing the pendulum valve, and release the gas, when opening the valve from the closed position. The valve arrangement can be controlled by a switching device suitably positioned, for example relative to the gear 42 so as to be triggered and released when the disk is moved into and out of its closed position. A bias spring 64 biases the pivot arm and disk 30 in an axial direction away from its closed position in order to insure that the valve will open when the pneumatic piston is released and the motor is used to move the disk 30 from its closed position.

The cam surface defined by slot 52 allows the disk 30 to rotate in the plane of the disk parallel to the opening 30, rotating from the opened position at a first angular position to a second angular position such that the disk 30 is substantially aligned with the opening 26. The disk-shaped valve body 30 moves within the plane of the disk because the slot of the cam element follows the roller in a purely rotational movement. However, when the disk-shaped body 30 and opening 26 are substantially axially aligned, and the shaft continues to rotate about its longitudinal axis, the cam surface of slot 52 follows the roller so that the longitudinal shaft 46, pivot arm 58 and disk 30 move longitudinally in the direction of the shaft axis with respect to the opening 26 into contact with a valve seat 32 provided inside of the interior space around the edge of opening 26.

The preferred gate valve assembly is used in an integrated turbo pump and control valve system of the type described in copending U.S. patent application Ser. No. 09/339,082, entitled Integrated Turbo Pump and Control Valve System, filed in the name of Joseph Maher and Richard W. Olmsted on the same day as the present application, and assigned to the present assignee (Attorney's docket no. MKS-58), the disclosure in that application being incorporated herein in its entirety by reference. As described therein, in ultra-high vacuum applications, it is important that the gate valve be completely closed and one of the control valves used to control the flow of gas through the system. In the arrangement described in that copending application the housing 22 is provided with a gas passageway 70 connected to each of the spaces on opposite sides of the disk 30 when the valve body is in the closed position. In one embodiment, three valves 72, 74 and 76 are mounted directly onto the housing 22 and arranged so as to control the flow of gas through the passageway 70 so that in operation a chamber can be pumped down with a second pump connected to one of the valves, through the gas passageway 70, and gas can be transferred, the flow controlled through the passageway bypassing the disk when the disk is in the closed position.

The rotating cam, valve closing mechanism provided at the rotation axis 48 of the disk 30 thus provides a simple arrangement avoiding the multiple actuator mechanisms of the prior art, eliminating the need to synchronize those mechanisms and thus provide better control of the closing of the gate valve.

It should be appreciated that various changes can be made without departing form the scope of the invention. For example, while the slot 52 is provided in the cam element 50 and fixed to the shaft, the arrangement can be reversed. In addition, while the gear 42 is fixed to the shaft 46, and thus moves axially relative to the gear 38 when the shaft 46 moves along axis 48, the gears can be axially fixed relative to one another, and the shaft 46 allowed to move axially relative to both. Also, the piston 60 and spring 64 can be reversed to spring close the valve. Finally, while three valves are shown integrally mounted to the housing, any number of valves can be so mounted, with as few as one, and as many as required by the particular design considerations.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A pendulum valve assembly comprising:
   a housing including an interior space and a pair of openings through which fluid can enter and exit the interior space;
   a valve seat disposed in the interior space around the edge of a first of said openings;

a valve body including a disk mounted relative to the housing so that the disk is movable within the interior space between a completely opened position and a completely closed position, the valve body being constructed so that when the disk is moved to the closed position the disk engages the valve seat and seals the first opening so that fluid can not pass therethrough;

a longitudinal shaft defining a longitudinal axis, fixedly coupled to the disk through at least one pivot arm and at least partially mounted within the housing so that (a) the shaft and disk can rotate about the longitudinal axis between a first angular position where the disk is in the completely opened position and a second angular position where the disk is substantially axially aligned with the first opening but spaced therefrom, and (b) the shaft and disk can move longitudinally, substantially parallel to the longitudinal axis, so that the disk can move between the second angular position and the closed position as it continues to rotate; and a cam mechanism coupled between the shaft and the housing and arranged so as to control the rotational movement of the shaft and disk between the first angular position and the second angular position and the longitudinal movement and continued rotational movement of the shaft and disk between the second angular position and the completely closed position.

2. A pendulum valve assembly according to claim 1, further including a reversible stepping motor coupled to the shaft for rotating the shaft and disk between the completely opened and closed positions.

3. A pendulum valve according to claim 2, wherein the reversible motor is coupled to the shaft through a gear mechanism.

4. A pendulum valve according to claim 3, wherein the motor includes a drive shaft, and the gear mechanism includes at least two gears, one fixed relative to the motor drive shaft and the other fixed relative to the longitudinal shaft, wherein the two gears are adapted to rotate relative to one another when the longitudinal shaft and disk are rotated between the completely opened and closed positions and move longitudinally relative to one another when the longitudinal shaft and disk are moved longitudinally between the second angular position and the completely closed position.

5. A pendulum valve according to claim 1 wherein the cam mechanism includes (a) a cam element fixed to the shaft so as to rotate and move longitudinally with the shaft, the cam element including a cam surface, and (b) a cam follower fixed relative to the housing and engaging the cam surface so as to define the movement of the shaft and disk relative to the housing.

* * * * *